Patented Oct. 15, 1929

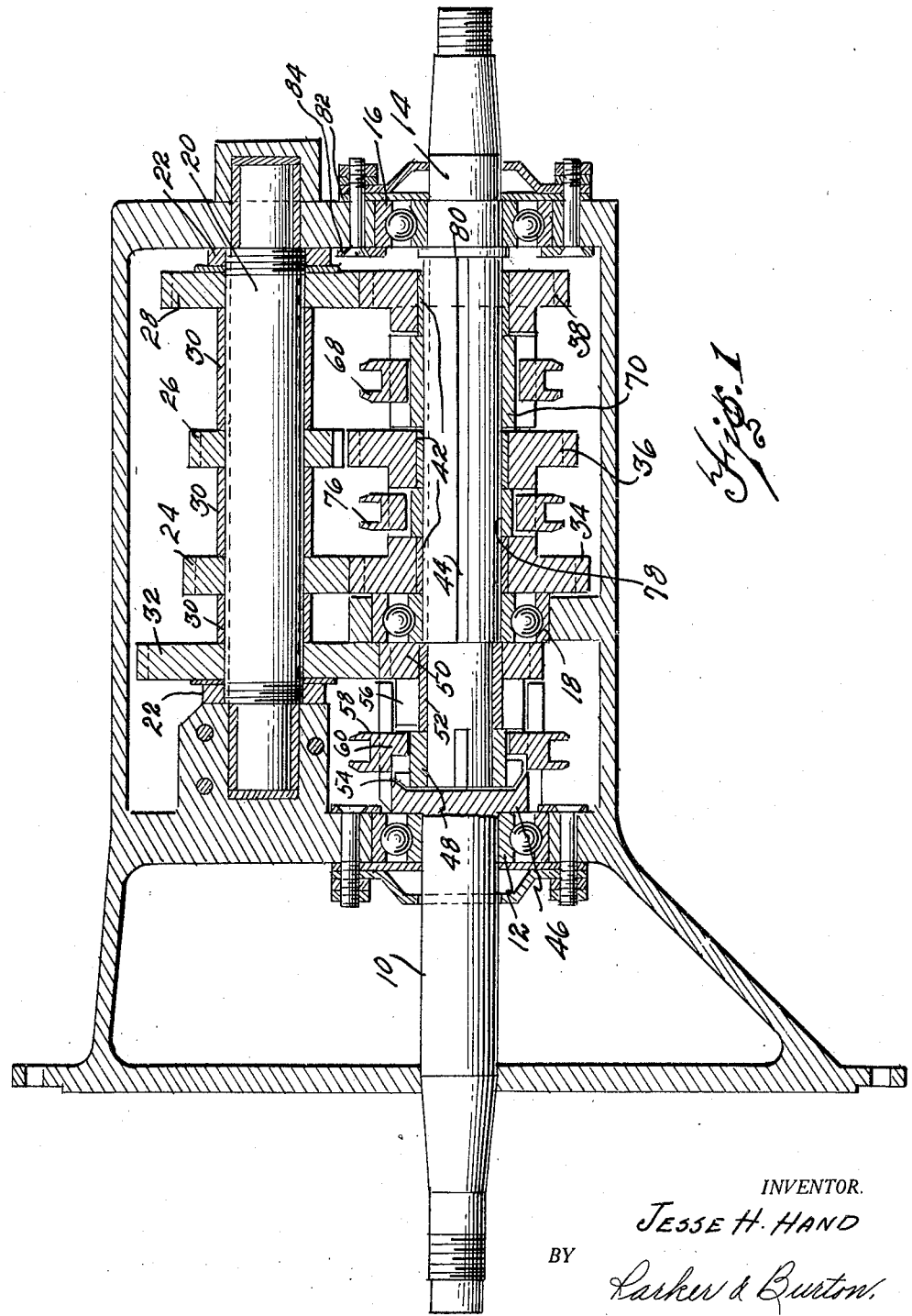

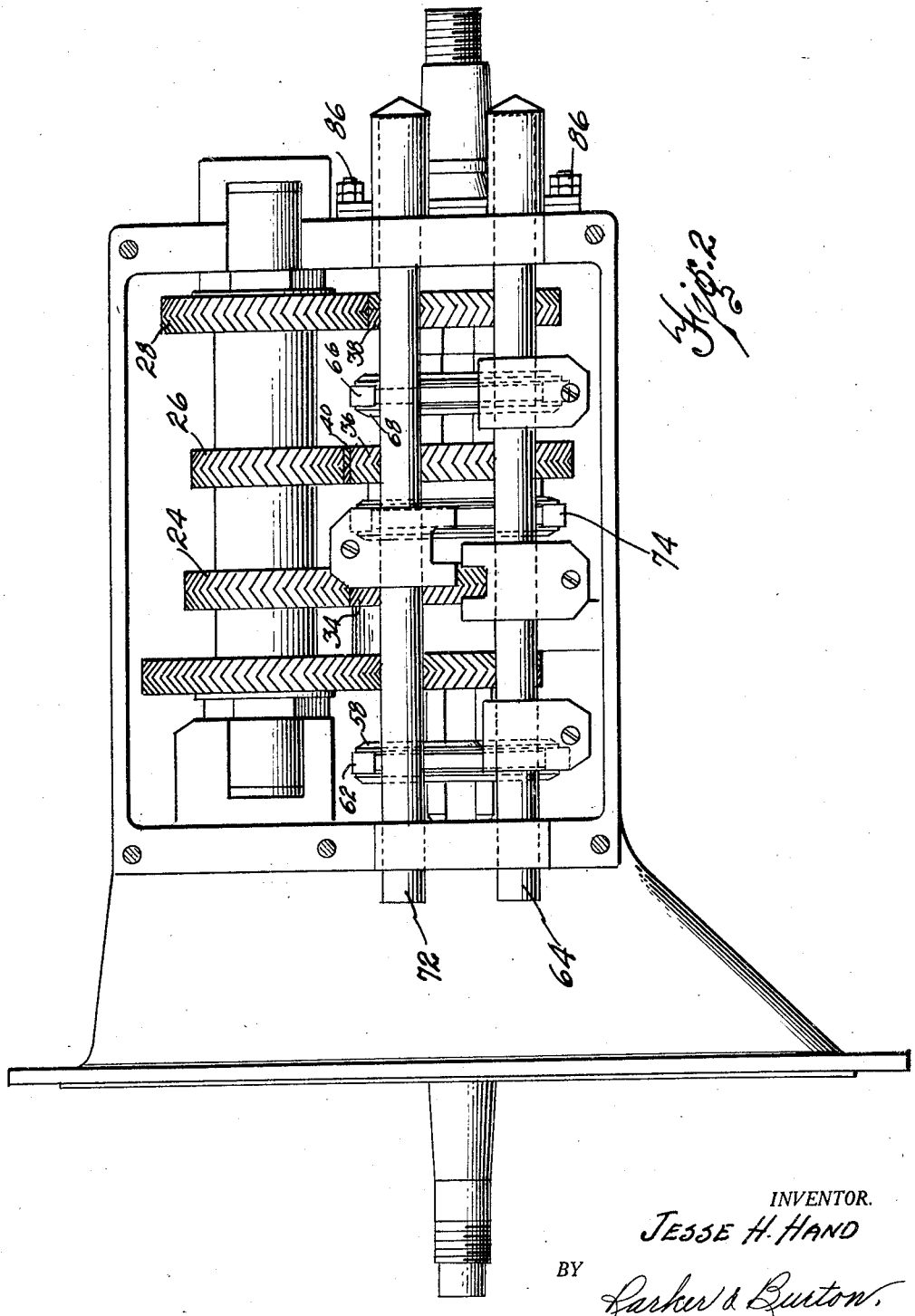

1,731,338

UNITED STATES PATENT OFFICE

JESSE H. HAND, OF CHICAGO, ILLINOIS

CHANGE-SPEED GEARING

Application filed September 19, 1927. Serial No. 220,409.

My invention relates to improvements in change speed gearing. It pertains particularly to change speed gearing of the constant mesh type and to gearing of the type disclosed in my previous Patent No. 1,472,122.

An object is to provide change speed gearing of this character comprising a minimum number of easily operable parts adapted to function in a positive, efficient and silent manner to accomplish changes in speed of the driven shaft and wherein at high speed the driving shaft and the main shaft rotate independently of the several change speed gears. A further object is to provide change speed gearing wherein means are provided to couple the main shaft directly with the driving shaft to rotate therewith and to couple the constantly meshed change speed gears with the driving shaft to rotate independently of the main shaft and wherein supplemental mechanism is provided to couple the main shaft with individual change speed gears thereon to cause said shaft to travel at different speeds.

A meritorious feature lies in the provision of a main shaft having a splined portion upon which constantly meshed change speed gears are rotatably mounted and clutch elements are coupled with the splined portion of the shaft to rotate therewith and are operable to lock the shaft to different change speed gears.

An additional meritorious feature lies in the provision of a main shaft so supported that it may be readily and quickly withdrawn from the housing of the gearing through the various driving elements which it carries.

An advantageous characteristic is the provision of change speed gears of the herringbone type which in the construction herein described serve to assist in maintaining the alignment of the constantly meshed gears.

A further object lies in the provision of change speed gearing of the type described wherein control and clutch mechanism is provided to initially couple the change speed gears to the driving shaft to be driven thereby and to thereafter couple the main shaft with a change speed gear rotatably supported thereon to drive the main shaft in the manner hereinafter more particularly described.

Various additional features and advantages will appear in the following specification and those hereinabove referred to will be more clearly brought out in such specification and claims and accompanying drawings.

In the drawings:

Fig. 1 is a vertical sectional view through my improved gearing.

Fig. 2 is a top plan view with the cover of the housing removed.

My gearing is of the constant mesh type. There is provided a driving shaft 10 supported in one end of the housing upon bearings 12, a main shaft 14 aligned with the driving shaft and supported in the other end of the housing by a bearing 16 and supported within the housing by a bearing 18 and a countershaft 20 supported at opposite ends in a suitable manner. I have shown nuts 22 threaded upon opposite ends of the countershaft to position the same in place. The countershaft carries change speed gears 24, 26, and 28, splined thereto to rotate therewith and held in spaced apart relationship by spacer elements 30. The countershaft also carries a driven gear 32 which is likewise splined to the shaft.

The main shaft carries change speed gears 34, 36 and 38 which are rotatably supported upon the main shaft and which are constantly in mesh to be driven by the gears on the countershaft, gears 26 and 36 being coupled through an idle reverse gear supported in a well known manner and here indicated as 40. Each of the change speed gears on the main shaft is shown as mounted upon bushings indicated as 42 and the main shaft is splined and the bushings are rotatably supported upon the splines. One of these splines is indicated as 44. A suitable plurality of splines are provided.

The driving shaft carries a hub 46. The end of the main shaft is disposed within this hub and carries a clutch collar 48 splined thereon to rotate therewith and a driving pinion 50 rotatably supported upon the main shaft, which pinion has an elongated hub 52. The clutch collar 48 is provided with locking recesses 54 and the hub 52 of the pinion is provided with locking recesses 56. The hollow hub 46 of the driving shaft carries a clutch ring 58 which encircles the hub and is provided with internal projecting lugs 60 that extend through slots in the hub 46 and are adapted to be moved into engagement with the clutch recesses 54 in the clutch collar 48 or into engagement with the clutch recesses 56 in the hub 52 of the driving pinion 50. In Fig. 1 the lugs 60 are shown in what might be termed a dead zone or neutral position between the locking recesses 54 and 56 and disengaged from each. This clutch ring is engaged by a shifter fork 62 which is coupled with the shift rod 64 to be actuated thereby. This shift rod 64 carries a second shifter fork 66 which encircles a clutch ring 68 which is slidably supported upon a clutch collar 70 splined upon the main shaft between the change speed gears 36 and 38 and which clutch ring is adapted to be moved into engagement with locking recesses formed on the hub of the change speed gear 38 to lock the main shaft to rotate therewith. There is a second shift rod indicated as 72 which carries a shifter fork 74 which encircles a clutch ring 76 mounted upon a clutch collar 78 to be actuated to engage either the change speed gear 34 or the change speed gear 36 to lock the main shaft with either gear for rotation.

In the operation of this device, as has been heretofore described in connection with my Patent No. 1,517,836 the high speed clutch ring has a position of disengagement such as is shown in Fig. 1 and is operable to be actuated to pick up the clutch collar 48 to lock the main shaft to the driving shaft to rotate therewith independently of the change speed gears and is adaptable to be actuated in the opposite direction to pick up the driving pinion 50 to drive the countershaft. In the present structure, however, when the driving pinion 50 is picked up to drive the countershaft, all the change speed gears are driven. It is possible to pick up the driving pinion to drive the change speed gears without actuating the shift rod 64 sufficiently to cause the clutch ring 68 to pick up the change speed gear 38 as the clutch recesses 56 are of sufficient length to accomplish this object and the clutch recesses on the clutch collar 70 are of sufficient length to permit idle movement of the clutch ring 68.

It will be seen that due to the fact that the change speed gears are being rotated upon picking up of the driving pinion 50, that when either clutch ring 76 or 68 is actuated to engage either change speed gears 34, 36 or 38, that such clutch rings couple a shaft which is either idle or moving at a less rate of speed than the gear to an overrunning gear in the normal building up of the transmission.

It will furthermore be seen that due to the mounting of the gears upon the splines that the space between the splines will be constantly filled with grease to provide unusually good lubrication.

The main shaft is shown as having a flange 80 which abuts the bearing 16 that supports one end of the shaft and such bearing is held in place in the wall of the housing by a pair of plates 82 and 84 which are positioned on opposite sides of the housing wall and overlap as shown in Fig. 1 the bearing 16 to hold it in place. These plates are held in place by bolts 86, four of which may be provided, and upon removal of the nuts on these bolts the main shaft with this bearing may be withdrawn from the change speed gears and clutch collars which are mounted upon it.

Change speed gears here shown are of the herringbone type and as a consequence not only provide an unusually good driving connection but also serve to assist in aligning the gears which are constantly in mesh.

What I claim is:

1. Change speed gearing having a housing, a driving shaft journaled in one end of the housing, a main shaft journaled in the opposite end of the housing in line with the driving shaft, said main shaft supported by a bearing removably mounted within the housing wall, plates detachably secured to opposite sides of said housing wall overlapping said bearing, said main shaft provided with gears and clutch elements freely removably supported thereon.

2. Change speed gearing having a driving shaft, a main shaft, a countershaft, constant mesh change speed gears coupling the driving shaft to the main shaft through the countershaft, a driving pinion rotatably supported upon the main shaft to drive the countershaft, clutch mechanism operable to couple the main shaft to the driving shaft to rotate therewith and operable to couple the change speed gears to the driving shaft to be rotated thereby, one of said change speed gears being rotatably supported upon the main shaft, clutch mechanism operable to connect said gear and main shaft to rotate as one piece, and control means connecting said clutch mechanisms for joint operation.

3. Change speed gearing having a driving shaft, a main shaft, a countershaft, constant mesh change speed gears mounted upon the main shaft and upon the counter shaft, coupling the main shaft with the driving shaft through the countershaft, clutch mechanism operable to couple the main shaft directly with the driving shaft to rotate therewith and operable to couple the change speed gears with the driving shaft to be driven thereby independently of the main shaft, one of said change speed gears being rotatably supported upon its shaft, clutch mechanism operable to connect said gear and shaft to rotate as one piece and control means connecting said clutch mechanisms for joint operation.

4. Change speed gearing having a driving shaft, a main shaft, a countershaft, constant mesh change speed gears coupling the main shaft with the driving shaft through the countershaft, one of said gears being rotatably supported upon the main shaft, a pair of clutch mechanisms one mechanism operable to connect the main shaft directly with the driving shaft independently of the change speed gears and to couple the change speed gears to the driving shaft to be driven therefrom independently of the main shaft and the other clutch mechanism operable to connect said rotatable change speed gear on the main shaft to the main shaft to rotate therewith.

5. Change speed gearing having a driving shaft, a main shaft, a countershaft, change speed gears on the countershaft to rotate therewith, change speed gears rotatably supported upon the main shaft constantly in mesh with the gears on the countershaft, a driving pinion rotatably supported upon the main shaft coupled with the countershaft to drive said shaft, a pair of shift rods, means operable by one of said rods to connect the main shaft with the driving shaft to rotate therewith independently of the change speed gears and to connect the change speed gears to the driving shaft to be driven thereby independently of the main shaft and to connect the main shaft to one of the rotatable change speed gears thereon to rotate therewith and means operable by the other shift rod to connect the main shaft to either one of a pair of gears rotatably supported thereon to rotate therewith.

6. Change speed gearing comprising, in combination, a driving shaft, a main shaft, a countershaft, change speed gears carried by the main shaft, cooperating change speed gears constantly in mesh therewith carried by the countershaft, a driving pinion rotatably supported upon the main shaft, clutch mechanism operable to couple the main shaft directly with the driving shaft to rotate therewith and operable to couple the change speed gears on the countershaft with the driving shaft through said driving pinion, one at least of the change speed gears on the main shaft being rotatably supported thereon, clutch mechanism operable to couple said gear to the main shaft to rotate therewith, control means operatively connected with both clutch mechanisms adapted when moved in a given direction to first actuate the first mentioned clutch mechanism to pick up the driving pinion to couple the change speed gears on the countershaft with the driving shaft to be driven thereby and to then actuate the second mentioned clutch mechanism to couple the rotatable change speed gear on the main shaft to rotate with the main shaft.

In testimony whereof, I, JESSE H. HAND, have signed this specification.

JESSE H. HAND.